United States Patent
Jung et al.

(10) Patent No.: US 11,827,067 B1
(45) Date of Patent: Nov. 28, 2023

(54) REINFORCING STRUCTURE OF THE SUSPENSION

(71) Applicants: HYUNDAI MOTOR COMPANY, Seoul (KR); KIA CORPORATION, Seoul (KR); HWASHIN CO., LTD., Yeongcheon-si (KR)

(72) Inventors: Gi Ryung Jung, Hwaseong-si (KR); Bong Su Kim, Seoul (KR); Hye Jin Han, Uiwang-si (KR); Hyun Jin Chung, Yeongcheon-si (KR); Su Heon Seo, Yeongcheon-si (KR)

(73) Assignees: HYUNDAI MOTOR COMPANY, Seoul (KR); KIA CORPORATION, Seoul (KR); HWASHIN CO., LTD., Yeongcheon-si (KR)

(*) Notice: Subject to any disclaimer, the term of this patent is extended or adjusted under 35 U.S.C. 154(b) by 0 days.

(21) Appl. No.: 17/975,044

(22) Filed: Oct. 27, 2022

(30) Foreign Application Priority Data

Jun. 15, 2022 (KR) .................. 10-2022-0072990

(51) Int. Cl.
*B60G 15/06* (2006.01)
*B60G 3/00* (2006.01)

(52) U.S. Cl.
CPC ............. *B60G 15/067* (2013.01); *B60G 3/00* (2013.01)

(58) Field of Classification Search
CPC ...... B60G 21/052; B60G 21/051; B60G 3/00; B60G 15/067
See application file for complete search history.

(56) References Cited

U.S. PATENT DOCUMENTS

| 8,308,175 | B2 | 11/2012 | Choi et al. | |
| 8,857,835 | B2* | 10/2014 | Lee | B60G 21/051 |
| | | | | 280/124.157 |
| 2014/0125025 | A1* | 5/2014 | Lee | B60G 21/051 |
| | | | | 280/124.1 |

(Continued)

FOREIGN PATENT DOCUMENTS

| CN | 114475137 A | * | 5/2022 | |
| CN | 115214284 A | * | 10/2022 | |
| DE | 9422472 U1 | * | 7/2003 | ........... B60G 21/051 |

(Continued)

OTHER PUBLICATIONS

JP 2005014833 A machine translation from espacenet.com (Year: 2023).*

*Primary Examiner* — Paul N Dickson
*Assistant Examiner* — Maxwell L Meshaka
(74) *Attorney, Agent, or Firm* — Morgan, Lewis & Bockius LLP

(57) ABSTRACT

A reinforcing structure for suspension, includes: a spring seat coupled to a torsion beam and a trailing arm, and configured for supporting a spring; and a shock absorber bracket coupled to the spring seat and the trailing arm, and configured for supporting a shock absorber for damping vibrations of the spring, wherein the shock absorber bracket includes, a side coupling portion coupled to the trailing arm, wherein the side coupling portion is coupled to a side surface of the trailing arm in a width direction (Y) of a vehicle body in a state of being inclined at a predetermined angle with respect to each of a longitudinal direction (X) and a height direction (Z) of the vehicle body.

16 Claims, 7 Drawing Sheets

(56) References Cited

U.S. PATENT DOCUMENTS

2023/0049765 A1* 2/2023 Lee .................... B60G 7/04

FOREIGN PATENT DOCUMENTS

| | | | |
|---|---|---|---|
| JP | 2000-142058 A | 5/2000 | |
| JP | 2005014833 A * | 1/2005 | ........... B60G 21/051 |
| JP | 2016-101849 A | 6/2016 | |
| JP | 2020164092 A * | 10/2020 | ........... B60G 21/051 |
| KR | 10-2007-0044570 A | 4/2007 | |
| KR | 10-2007-0094086 A | 9/2007 | |
| KR | 10-2008-0055184 A | 6/2008 | |
| KR | 10-2020-0109709 A | 9/2020 | |
| WO | WO-2022094063 A1 * | 5/2022 | |

* cited by examiner

REINFORCING STRUCTURE OF THE SUSPENSION

CROSS-REFERENCE TO RELATED APPLICATION(S)

The present application claims priority to Korean Patent Application No. 10-2022-0072990 filed on Jun. 15, 2022 the entire contents of which is incorporated herein for all purposes by this reference.

BACKGROUND OF THE PRESENT DISCLOSURE

Field of the Present Disclosure

The present disclosure relates to a reinforcing structure for suspension.

Description of Related Art

A suspension of a vehicle is a device affecting ride comfort and stability of a vehicle by absorbing shocks or vibrations generated while driving so that the shocks or vibrations are not directly transmitted to a vehicle body or an occupant. Suspension applied to vehicles includes a MacPherson strut, a double wishbone, a multilink, a coupled torsion beam axle (CTBA), and the like, depending on the structure thereof.

Thereamong, the CTBA has advantages in that a structure thereof is simple, the number of parts is small, and only a small space is occupied thereby so that it is widely applied to small cars. When the CTBA is applied to a vehicle subjected to a large load, not only a load transmitted through a spring increases, but also a contact frequency of a bump stopper increases, and the transmitted load also increases. Therefore, there may be a problem in that durability must be increased so that the shock absorber bracket to which a load of the shock absorber is transmitted and the spring seat to which a load of the spring is transmitted can withstand the increasing load. To increase durability, when a thickness of the corresponding part is made thick or material of the corresponding part is changed, there was a problem in that a weight of the vehicle body and costs may be increased.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a reinforcing structure for suspension having improved durability that can support a large load input through a spring and a shock absorber.

According to an aspect of the present disclosure, a reinforcing structure for suspension includes: a spring seat coupled to a torsion beam and a trailing arm, and configured for supporting a spring; and a shock absorber bracket coupled to the spring seat and the trailing arm, and configured for supporting a shock absorber for damping vibrations of the spring, wherein the shock absorber bracket may include a side coupling portion coupled to the trailing arm, and the side coupling portion may be coupled to a side surface of the trailing arm in a width direction (Y) of a vehicle body in a state of being inclined at a predetermined angle with respect to each of a longitudinal direction (X) and a height direction (Z) of the vehicle body.

The shock absorber bracket may further include an upper coupling portion coupled to an upper surface of the trailing arm.

The side coupling portion may be inclined in a state in which a length of a component of the side coupling portion in the height direction (Z) is equal to or greater than a length of a component of the side coupling portion in the longitudinal direction (X) of the vehicle body.

The shock absorber bracket may include a first wing portion disposed to face the trailing arm, a second wing portion disposed between the first wing portion and the trailing arm to face the trailing arm, the second wing portion including the side coupling portion and the upper coupling portion, and a body portion connecting the first wing portion and the second wing portion, and the first wing portion and the second wing portion may be coupled to the spring seat to support a load applied to the spring seat.

Each of the first wing portion and the second wing portion may be bonded to a lower surface of the spring seat, and a coupling length between the second wing portion and the lower surface of the spring seat may be equal to or greater than a coupling length between the first wing portion and the lower surface of the spring seat.

The spring seat may further include: a spring seating portion supporting the spring, a first coupling portion coupled to the trailing arm to support the spring seating portion, a second coupling portion coupled to the torsion beam and the spring seating portion to support the spring seating portion, and a third coupling portion coupled to a side surface of the trailing arm in a width direction (Y) of the vehicle body.

The first wing portion may be coupled to a lower surface of the spring seating portion, and the second wing portion may be coupled to a lower surface of the first coupling portion, and a coupling length between the second wing portion and the lower surface of the spring seat may be equal to or greater than a coupling length between the first wing portion and the lower surface of the spring seat.

The shock absorber bracket may further include: a first wing portion disposed to face the trailing arm, a second wing portion disposed between the first wing portion and the trailing arm to face the trailing arm, the second wing portion including the side coupling portion, and a body portion connecting the first wing portion and the second wing portion, wherein the second wing portion may further include a first reinforcing portion for inducing a load transmitted to the shock absorber bracket to the trailing arm.

The first reinforcing portion may have a bent cross-sectional shape, and may have a shape extending along a bonding surface of the second wing portion and the spring seat from an upper end portion of the second wing portion downwardly.

The first reinforcing portion may have a bent cross-sectional shape, and may have a shape extending along a bonding surface of the second wing portion and the body portion.

The first reinforcing portion may have a shape extending in a height direction (Z) of the vehicle body and then extending in a longitudinal direction (X) of the vehicle body.

The spring seat may further include a second reinforcing portion between the first coupling portion and the spring seat portion for inducing a load transmitted to the spring seat to the trailing arm.

The second reinforcing portion may form a step difference between the first coupling portion and the spring seating portion along a connection portion of the first coupling portion and the spring seating portion.

A thickness of the spring seat may be less than or equal to a thickness of the shock absorber bracket.

According to another aspect of the present disclosure, a reinforcing structure for suspension may include: a spring seat coupled to a torsion beam and a trailing arm, the spring seat having a spring mounted thereon, and a shock absorber bracket coupled to the trailing arm by at least two coupling portions, the shock absorber bracket having a shock absorber mounted thereon, wherein the shock absorber bracket may be coupled to an upper surface of the trailing arm while forming inclination, narrower than a predetermined angle of inclination with respect to a longitudinal direction (X) of the vehicle body, and may be coupled to a side surface of the trailing arm in a width direction (Y) of the vehicle body, while forming inclination with respect to each of the longitudinal direction (X) of the vehicle body and the height direction (Z) of the vehicle body.

The predetermined angle of inclination may be 0 degrees or more and 20 degrees or less.

In the coupling portion being coupled thereto, while forming the inclination, a ratio of a length in the height direction (Z) of the vehicle body with respect to a length of the inclination in the longitudinal direction (X) of the vehicle body may be 1 or more.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
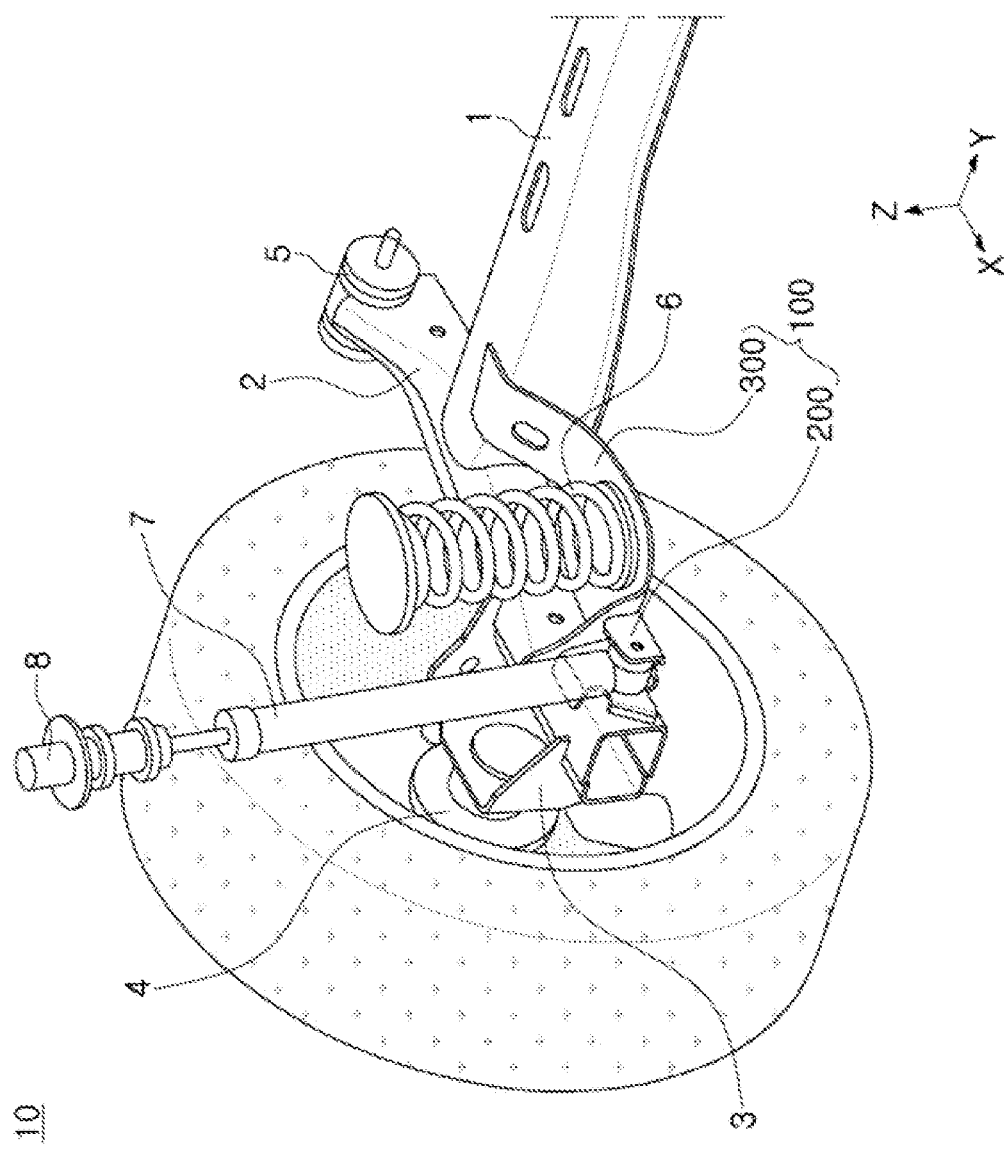
FIG. 1 is a perspective view exemplarily illustrating one side surface of a coupled torsion beam axle (CTBA) according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims. Since the present disclosure may have various changes and may have various exemplary embodiments of the present disclosure, specific embodiments may be illustrated in the drawings and described in detail. However, this is not intended to limit the present disclosure to specific embodiments, it should be understood to include all modifications, equivalents, and substitutes included in the spirit and scope of the present disclosure.

Terms such as first, second, and the like may be used to describe various elements, but the elements should not be limited by the terms. The above terms may be used only for distinguishing one component from another. For example, without departing from the scope of the present disclosure, a first component may be referred to as a second component, and similarly, a second component may also be referred to as a first component. The term "and/or" may include a combination of a plurality of related listed items or any of the plurality of related listed items.

The terms used in the present application may be only used to describe specific embodiments, and are not intended to limit the present disclosure. The singular expression may include the plural expression, unless the context clearly dictates otherwise. In the present application, it should be understood that terms such as "include," "comprise," or "have" are intended to designate that features, numerals, steps, operations, components, parts, or combination thereof described in the specification exists, but one or more other features this does not preclude the existence or addition of numbers, steps, operations, components, parts, or combinations thereof.

Unless defined otherwise, all terms used herein, including technical or scientific terms, have the same meaning as that which can commonly understood by one of ordinary skill in the art to which the present disclosure belongs. Terms such as those defined in a commonly used dictionary should be interpreted as having a meaning consistent with the meaning in the context of the related art, and should not be interpreted in an ideal or excessively formal manner unless explicitly defined in the present application.

Hereinafter, various exemplary embodiments of the present disclosure will be described in more detail with reference to the accompanying drawings.

FIG. 1 is a perspective view exemplarily illustrating side surface of a coupled torsion beam axle 10 according to an exemplary embodiment of the present disclosure.

The coupled torsion beam axle (CTBA) 10 may include a torsion beam 1, a trailing arm 2, a spring 6, a spring seat 300, and a shock absorber 7, a shock absorber bracket 200, and a bump stopper 8.

The torsion beam 1 may be disposed to extend in the width direction (Y) of the vehicle body between a left wheel and a right wheel. For example, the torsion beam 1 may be mounted on a left rear wheel and a right rear wheel, but an exemplary embodiment thereof is not limited thereto. The torsion beam 1 may be provided on the left and right sides using elastic torsional force, and independent movement of the trailing arm 2 to which a wheel 4 of the vehicle body is connected may be suppressed by the elastic force.

The trailing arm 2 may be provided at both end portions of the torsion beam 1 in the longitudinal direction (X) of the vehicle body. A spindle bracket 3 for mounting the wheel 4 of the vehicle body may be fixed to an external side in the width direction (Y) of the vehicle body. The trailing arm 2 may be coupled to the vehicle body through a bushing 5 provided at an end portion on a side of a front portion of the vehicle body of the trailing arm 2. The trailing arm 2 may be coupled to the spring seat 300 on which the spring 6 is mounted and the shock absorber bracket 200 on which the shock absorber 7 is mounted to support the spring seat 300 and the shock absorber bracket 200. The spring seat 300 may be disposed on an internal side surface in the width direction (Y) of the vehicle body.

The spring 6 may be mounted on and supported by the spring seat 300, and the shock absorber 7 may be mounted on and supported by the shock absorber bracket 200. The shock absorber 7 may further include a bump stopper 8 at one end portion. When the spring 6 is completely contracted due to a strong impact or the like, by preventing the suspension from being in direct contact with the vehicle body, the bump stopper 8 may absorb the shock applied to the vehicle body.

Figure 6:
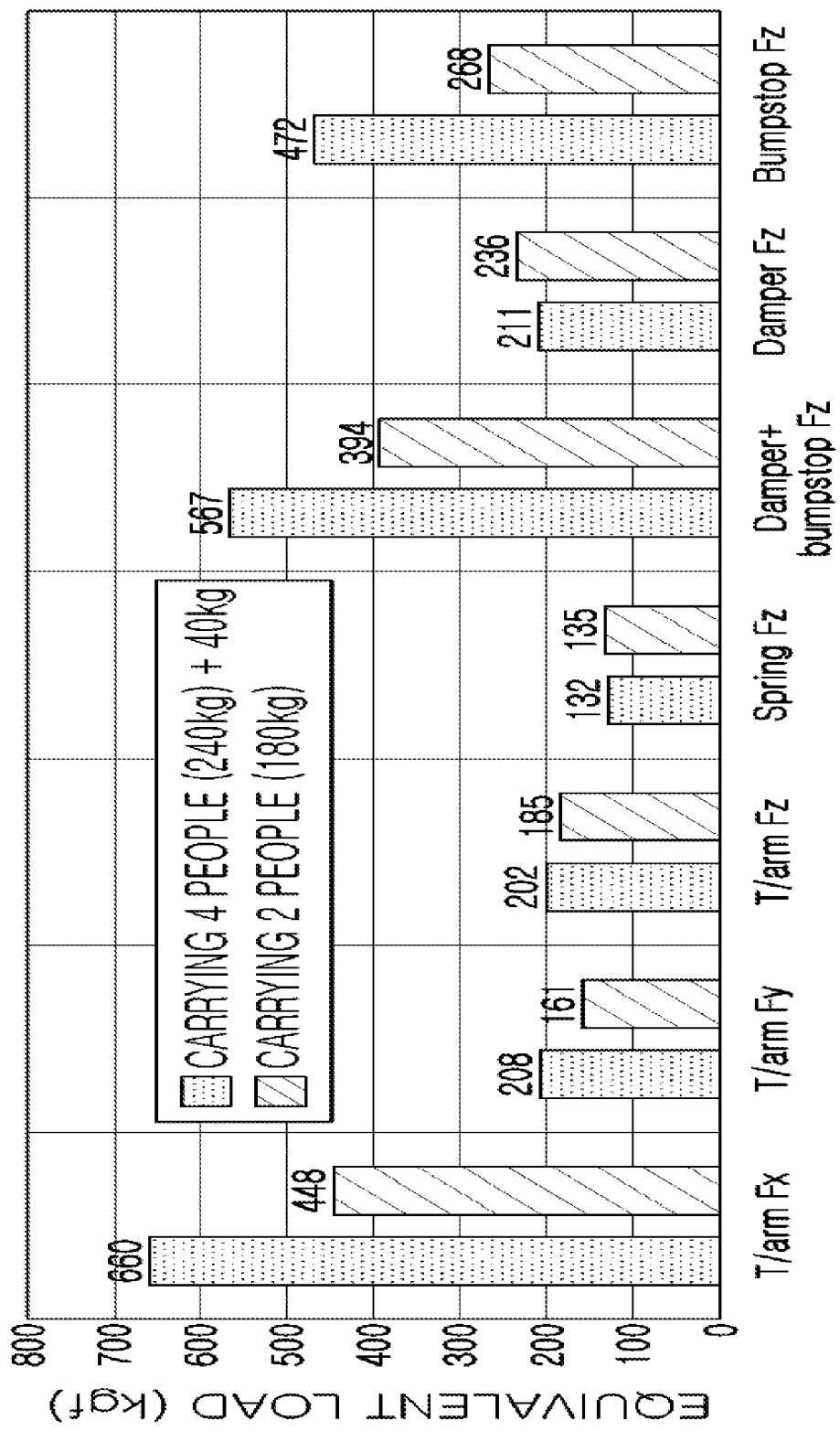
FIG. 6 is a graph exemplarily illustrating a magnitude of the load applied to the trailing arm, the spring, and the bump stopper according to an increase in the load on the vehicle body.

When vibrations or shocks occur in the vehicle body, the vibrations and shocks transmitted from the ground to the vehicle body may be absorbed by the spring 6. Energy absorbed by the spring 6 is converted into potential energy of the spring 6, and accordingly, the spring 6 vibrates. The shock absorber 7 can attenuate vibrational energy of the spring 6. That is, the shock absorber 7 may improve riding comfort by reducing amplitude and a vibration time. Referring to FIG. 6, when the load applied to the vehicle body increases, the load in the height direction of the vehicle body also increases, but the load in the longitudinal direction (X) of the vehicle body also increases significantly. Therefore, it is necessary to increase durability in the longitudinal direction (X) of the vehicle body of the vehicle body as well as in the height direction of the vehicle body.

Figure 2:
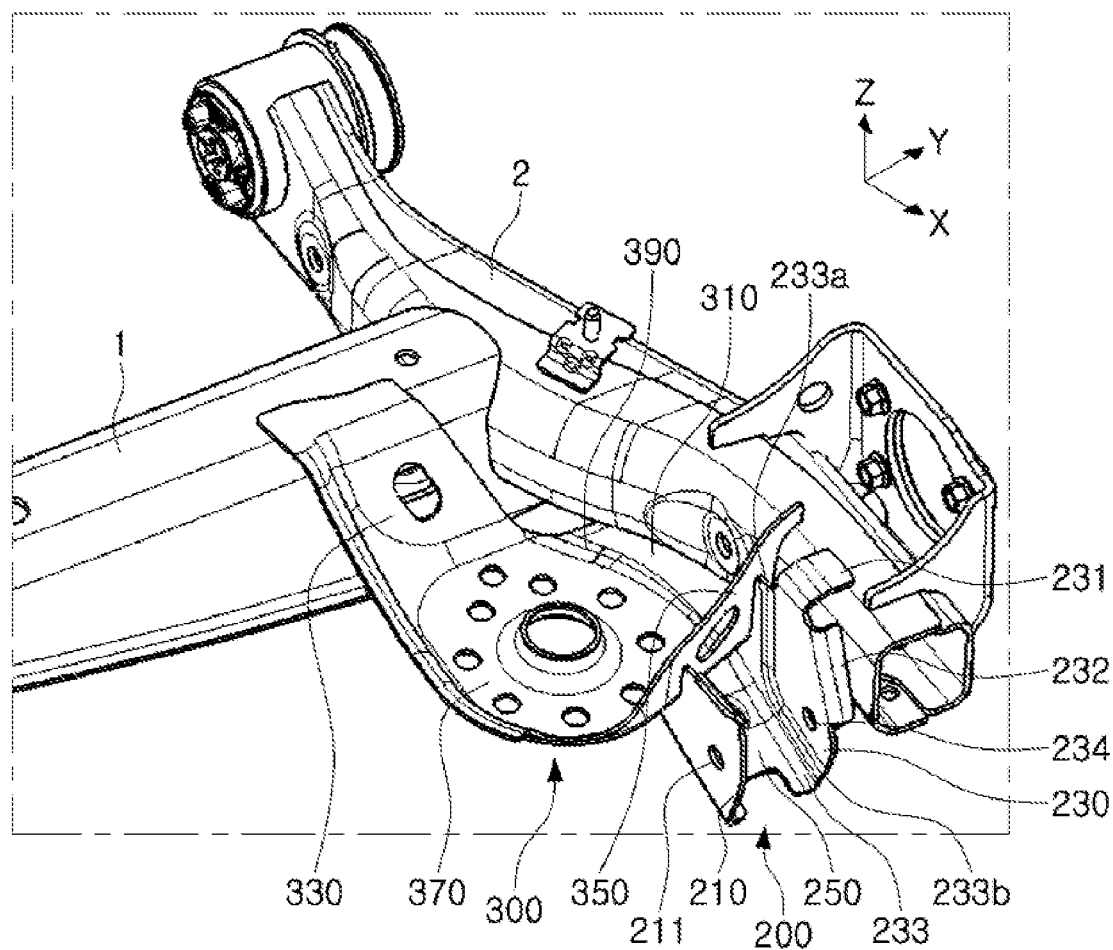
FIG. 2 is a perspective view of a reinforcing structure for suspension according to an exemplary embodiment of the present disclosure.
Figure 3A:
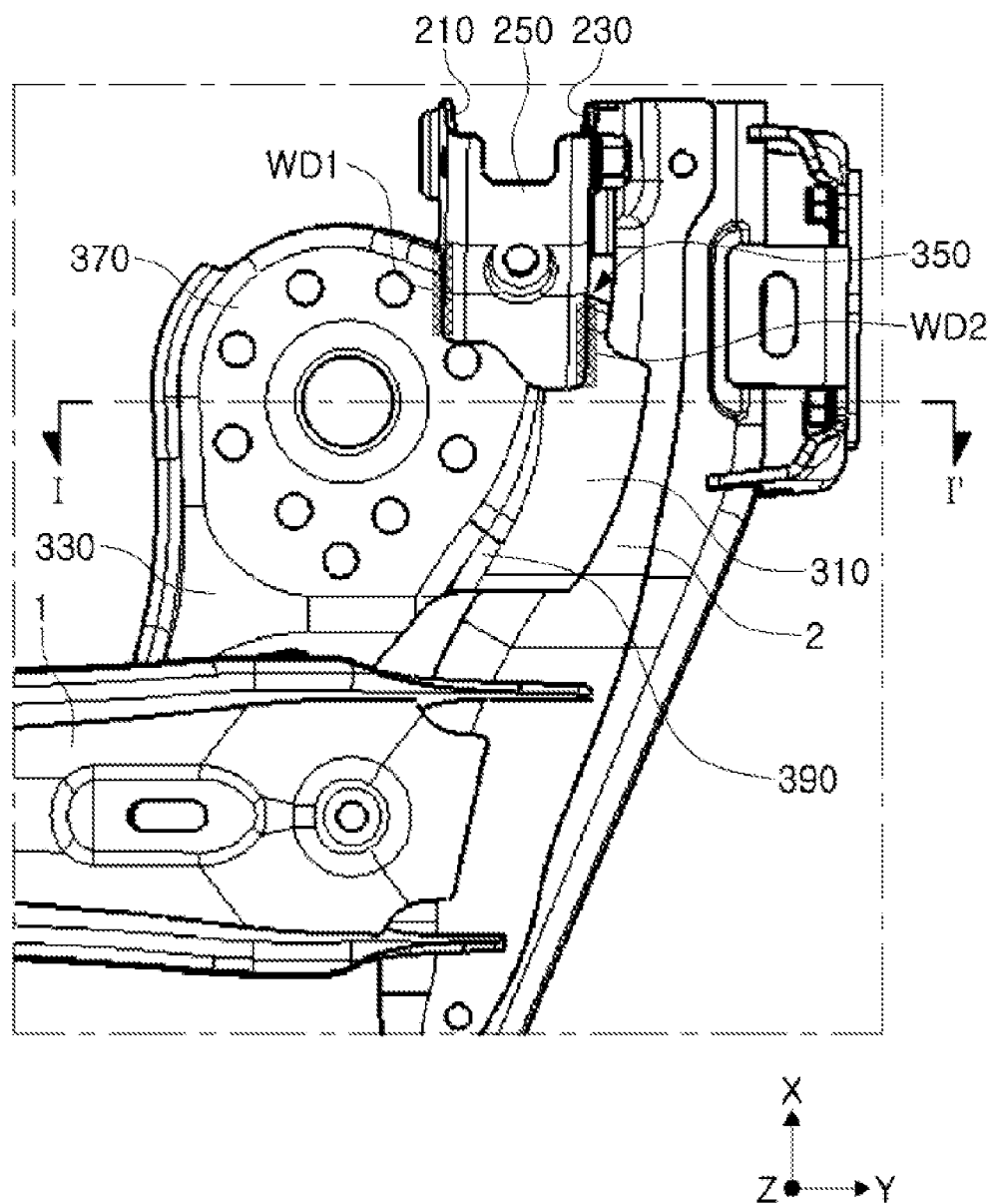
FIG. 3A is a bottom view of a reinforcing structure for suspension according to an exemplary embodiment of the present disclosure.
Figure 4:
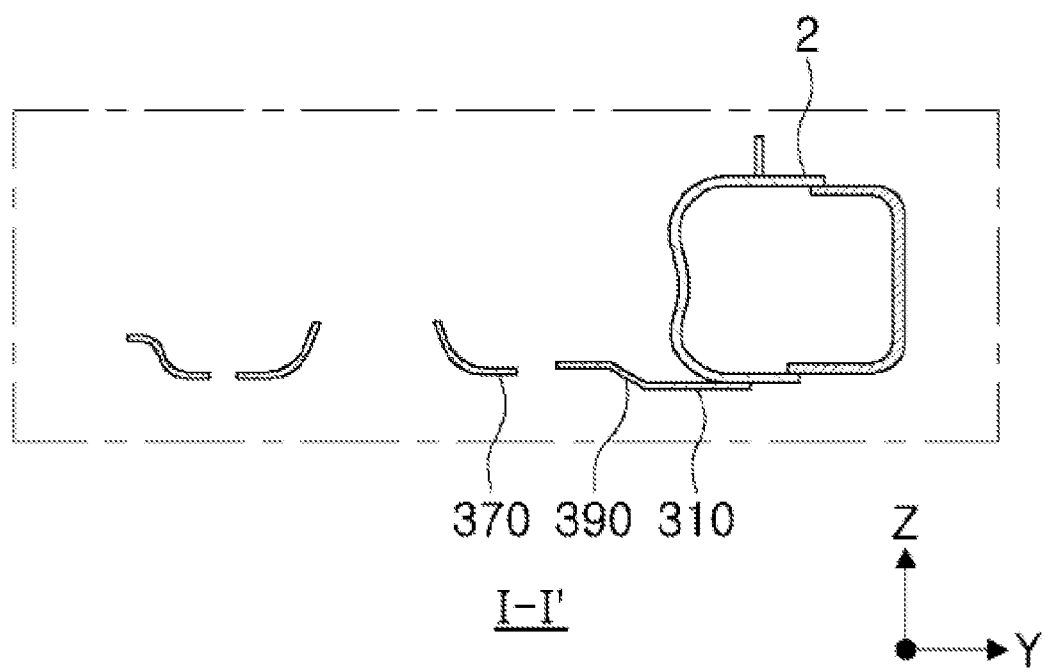
FIG. 4 is a cross-sectional view taken along line I-I' of FIG. 3A.

FIG. 2 is a perspective view showing a reinforcing structure for suspension 100 according to an exemplary embodiment of the present disclosure, FIG. 3A is a bottom view exemplarily illustrating a reinforcing structure of a suspension 100 according to an exemplary embodiment of the present disclosure, and FIG. 4 is a cross-sectional view taken along line I-I' of FIG. 3A.

Referring to FIG. 2 together with FIG. 1, the shock absorber bracket 200 and the spring seat 300 may be coupled between the trailing arm 2 and the torsion beam 1. The shock absorber bracket 200 and the spring seat 300 may be welded and coupled to the trailing arm 2 and the torsion beam 1. The shock absorber bracket 200 may be disposed between the spring seat 300 and the trailing arm 2 to be welded and coupled to the spring seat 300 and the trailing arm 2, respectively. The spring seat 300 may be disposed between the shock absorber bracket 200, and the torsion beam 1 and the trailing arm 2 to be welded and coupled to each other.

The shock absorber bracket 200 supports a shock absorber 7, and the shock absorber 7 may further include a bump stopper 8 opposite to the shock absorber bracket 200. The shock absorber bracket 200 may support a load applied to the shock absorber 7 or the bump stopper 8. A spring 6 may be mounted on the spring seat 300, and the spring seat 300 may support a load applied to the spring 6.

The shock absorber bracket 200 may include a first wing portion 210, a second wing portion 230, and a body portion 250. The first wing portion 210 may be disposed to face the trailing arm 2, and the second wing portion 230 may be disposed in a space between the trailing arm 2 and the first wing portion 210 to face the first wing portion 210. Lower end portions of the first wing portion 210 and the second wing portion 230 may be coupled to and connected to the body portion 250, respectively, and the first wing portion 210 the second wing portion 230, and the body portion 250 may form a substantially "U"-shaped cross-section. The first wing portion 210 and the second wing portion 230 may be coupled to the spring seat 300 by extending downwardly of the spring seat 300.

The first wing portion 210 may include a first fixing hole 211 facing the second fixing hole 234 of the second wing portion 230. The shock absorber 7 may be mounted to the shock absorber bracket 200 through fixing members such as bolts, pins, and the like, penetrating through the first fixing hole 211 and the second fixing hole 234.

The second wing portion 230 may be respectively connected to the spring seat 300 and the trailing arm 2. The second wing portion 230 may include a side coupling portion 232 coupled to a side surface of the trailing arm 2. The second wing portion 230 may further include an upper coupling portion 231 coupled to an upper surface of the trailing arm 2. A lower end portion of the second wing portion 230 may be connected to the body portion 250. The second wing portion 230 may further include a first reinforcing portion 233 increasing rigidity of the second wing portion 230.

The side coupling portion 232 may be bent and extended from one side of the second wing portion 230 toward the trailing arm 2. The side coupling portion 232 may be located on a side surface opposite to a portion to which the spring seat 300 and the second wing portion 230 are coupled. The side coupling portion 232 may be welded and coupled to a side surface of the trailing arm 2 in the width direction (Y) of the vehicle body at a predetermined angle. Here, the side surface of the trailing arm 2 in the vehicle body width direction Y may be a side surface to which the trailing arm 2 and the torsion beam 1 are coupled, or a side surface to which the pair of trailing arms 2 face each other, or an opposite side surface of the side surface on which the spindle bracket (3 in FIG. 1) on which the wheel (4 in FIG. 1) is mounted on the trailing arm 2 is provided.

The side coupling portion 232 may be welded and coupled to the side surface of the trailing arm in the width direction (Y) of the vehicle body in a state of being inclined at a predetermined angle with respect to each of the longitudinal direction (X) and the height direction (Z) of the vehicle body. The side coupling portion 232 may have an inclined shape in a state in which a length of a component of the side coupling portion in the height direction (Z) is equal to or greater than a length of a component of the side coupling portion 232 in the longitudinal direction (X). That is, the side coupling portion 232 may have a value having a ratio of a length thereof in the height direction (Z) of the vehicle body to a length thereof in the longitudinal direction (X) of the vehicle body of 1 or more. For example, the side coupling portion 232 may have an angle of 45 degrees to 70 degrees in the height direction (Z) of the vehicle body with respect to the longitudinal direction (X) of the vehicle body. When the load applied to the vehicle body increases, the load in the vehicle body length direction (X) of the vehicle body increases significantly. However, in view of the roles and functions of the spring 6, the shock absorber 7, and the bump stopper 8, a main load still acts in the body height direction Z. Accordingly, the side coupling portion 232 may form an angle of 45 degrees or more in the height direction (Z) with respect to the longitudinal direction (X) of the vehicle body to support a higher load in the height direction of the vehicle body. The side coupling portion 232 may be coupled to the trailing arm 2 in an inclined state, so that it is possible to have durability to a load in the longitudinal direction (X) of the vehicle body and a load in the height direction (Z) of the vehicle body, which are generated when a high load is applied to the vehicle body.

The second wing portion 230 may further include an upper coupling portion 231 coupled to an upper surface of the trailing arm. The upper coupling portion 231 may be provided at an upper end portion of the second wing portion 230, and may be bent and extended toward the trailing arm 2 to be coupled to the upper surface of the trailing arm 2. A lower surface of the upper coupling portion 231 may be welded and coupled while in contact with the upper surface of the trailing arm 2. Referring to FIG. 6, when the load applied to the vehicle body increases, a load in the height direction Z of the vehicle body applied to the bump stopper 8 greatly increases. Accordingly, the shock absorber bracket 200 supporting the load of the bump stopper 8 may not have sufficient durability in the height direction of the vehicle body due to the coupling of the side coupling portion 232. The upper coupling portion 231 may be coupled to the upper surface of the trailing arm, to support a load in the height direction Z of the vehicle body together with the side coupling portion 232. The upper coupling portion 231 may form a coupling portion with the upper surface of the trailing arm 2 in a longitudinal direction (X) of the vehicle body. The upper coupling portion 231 may be formed generally in the longitudinal direction (X) of the vehicle body. However, the upper coupling portion 231 may have a slight inclination with the longitudinal direction (x) of the vehicle body. For example, the upper coupling portion 231 may be welded and coupled to the upper surface of the trailing arm 2 while forming an angle of 0 degrees or more and 20 degrees or less with the longitudinal direction (X) of the vehicle body.

Referring back to FIG. 2, the spring seat 300 may include a first coupling portion 310, a second coupling portion 330, a third coupling portion 350, and a spring seating portion 370.

The spring seat 300 may be coupled to the torsion beam 1, the trailing arm 2, and the shock absorber bracket 200. For example, the spring seat may be welded and coupled to the torsion beam 1, the trailing arm 2, and the shock absorber bracket 200. The first coupling portion 310 may be coupled to a lower surface of the trailing arm 2 by wielding, or the like. The second coupling portion 330 may be coupled to an upper surface of the torsion beam 1 by welding, or the like. The third coupling portion 350 may be coupled to an internal side surface of the trailing arm 2 by welding, or the like. The spring seating portion 370 may support the spring 6, and may be connected to the first coupling portion 310, the second coupling portion 330, and the third coupling portion 350.

Furthermore, one end portion of the first coupling portion 310 may be connected to the spring seating portion 370, and the other end portion thereof may be welded and coupled to the trailing arm 2. One end portion of the second coupling portion 330 may be connected to the spring seating portion 370, and the other end portion thereof may be welded and coupled to the torsion beam 1. The third coupling portion 350 may be formed in a vertical direction with respect to the spring seating portion 370, so that one side of the third coupling portion 350 may be connected to the spring seating portion 370, and the other side thereof may be welded and coupled to the trailing arm 2. Furthermore, one surface of the third coupling portion 350 may be welded and coupled to the first wing portion 210 and the second wing portion 230 of the shock absorber bracket 200.

Here, the first coupling portion 310 forms a coupling portion on a lower surface of the trailing arm 2 in a longitudinal direction (X) of the vehicle body, and the second coupling portion 330 forms a coupling portion on an upper surface of the torsion beam 1 in a longitudinal direction (X) of the vehicle body. The third coupling portion 350 forms a coupling portion in a vertical direction from the upper surface to the lower surface thereof around the internal side surface of the trailing arm 2. Each of the coupling portions forms a coupling portion in different directions, so that it is possible to secure durabliity to loads in various directions.

A coupling structure of the shock absorber bracket 200 and the spring seat 300 will be described with reference to FIG. 2 and FIG. 3A. Each of the first wing portion 210 and the second wing portion 230 of the shock absorber bracket 200 may extend downwardly of the spring seat 300 to be welded and coupled to the spring seat 300. The first wing portion 210 may be welded and coupled to the coupling portion 350 and the lower surface of the spring seating portion 370, and the second wing portion 230 may be welded and coupled to the third coupling portion 350 and the lower surface of the first coupling portion 310. Here, a length of a second coupling portion WD2 between the second wing portion 230 and the first coupling portion 310 may be equal to a length of a first coupling portion WD1 between the first wing portion 210 and the spring seating portion 370 or longer than the length of the first coupling portion WD1. The second coupling portion WD2 is located closer to the trailing arm 2 than the first coupling portion WD1. That is, even if the same force is applied to the second coupling portion WD2 and the first coupling portion WD1, a smaller torque is generated at the second coupling portion WD2. Therefore, by making the length of the second coupling portion WD2 longer than the length of the first coupling portion WD1 to induce the force applied to the shock absorber bracket 200 toward the trailing arm 2, the durability of the shock absorber bracket 200 may be increased.

Referring to FIG. 3A, the third coupling portion 350 may be coupled to the trailing arm 2 in an inclined state with respect to a vertical direction to the trailing arm 2. In other words, the third coupling portion 350 may be coupled to the trailing arm 2 in a state in which a surface to which the third coupling portion 350 and the shock absorber bracket 200 are coupled and a side surface of the trailing arm 2 have inclination at an angle of less than 90 degrees with respect to the vertical direction.

Figure 3B:
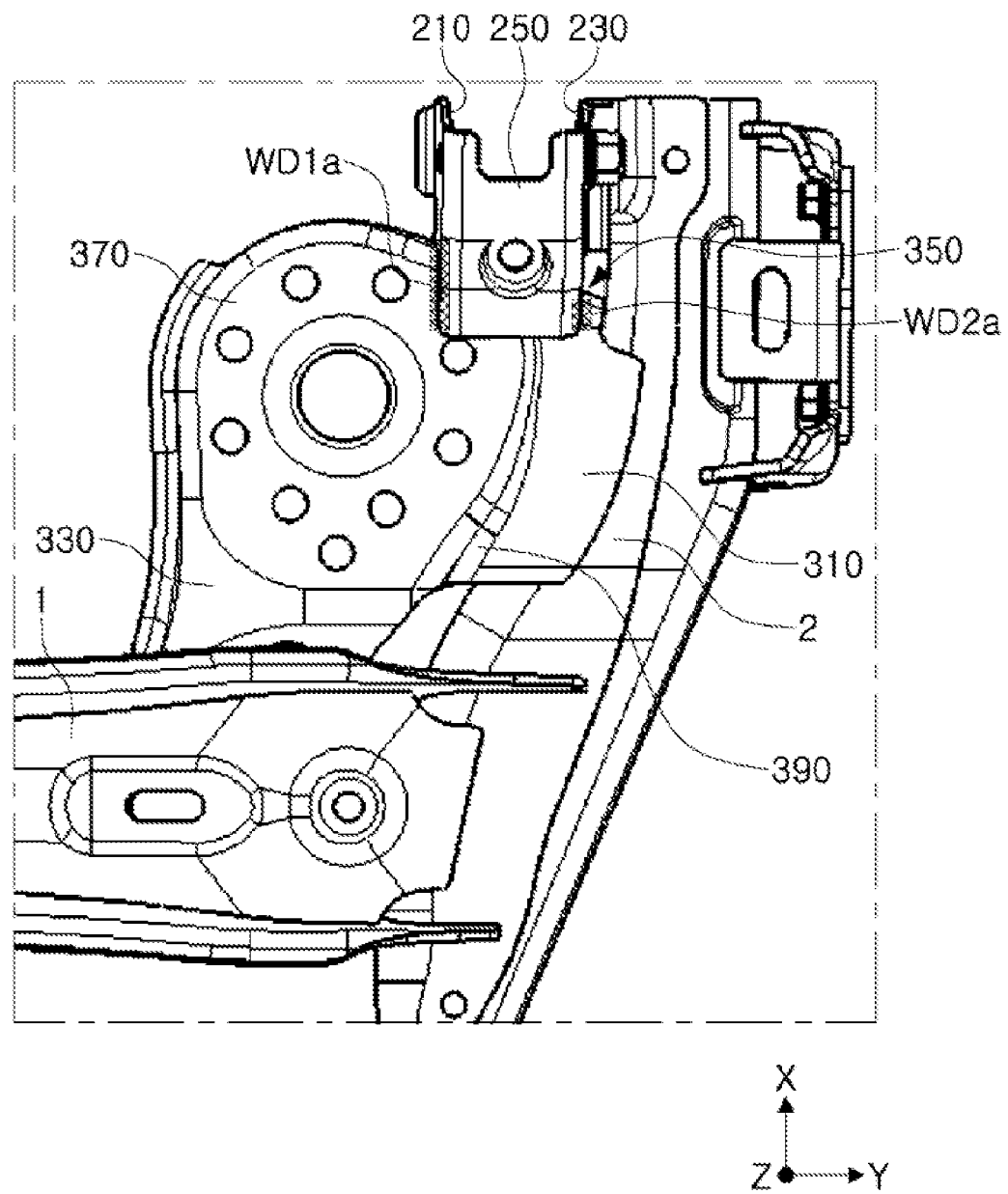
FIG. 3B is a bottom view of the reinforcing structure for suspension illustrating a coupling length between the spring seat and each of the first and second wing portions, when the first wing portion and the second wing portion have lower end portions of the same length.

If, as exemplarily illustrated in FIG. 3B, assuming that lower end portions of the first wing portion 210 and the second wing portion 230 have the same length, a length of a first coupling portion WD1a may be longer than a length of a second coupling portion WD2a. When the length of the first coupling portion WD1a increases, a load transmitted to the first wing portion 210 may increase. In other words, a relatively greater load than the second wing portion 230 may be induced to the first wing portion 210, located distantly from the trailing arm 2. Therefore, in comparison with FIG. 3A, even when the same load is applied to the shock absorber bracket 200 as a whole, a greater amount of torque is generated in the first wing portion 210, reducing durability of the shock absorber bracket 200.

On the other hand, according to the exemplary embodiment of FIG. 3A, a lower end portion of the second wing portion 230 may be formed to be longer than a lower end portion of the first wing portion 210, so that the length of the second coupling portion WD2 is equal to or greater longer than the length of the first coupling portion WD1. Accordingly, by inducing the load applied to the shock absorber bracket 200 toward the trailing arm 2 through the second wing portion 230 to reduce an amount of the torque, durability may be improved.

Referring to FIG. 2 again, the shock absorber bracket 200 may further include a first reinforcing portion 233 on the second wing portion 230. The first reinforcing portion 233 may induce the load applied to the shock absorber bracket 200 to the trailing arm 2 by reinforcing the rigidity of the second wing portion 230 located on a side of the trailing arm 2. The first reinforcing portion 233 may be formed in various shapes on the second wing portion 230. For example, the first reinforcing portion 233 has a shape extending from an upper end portion 233a of the second wing portion 230 downwardly along a bonding surface of the third coupling portion 350 of the spring sheet 300. Furthermore, the first reinforcing portion 233 may be formed to have a shape extending from a side surface 233b of the second wing portion 230 along a connection surface between the second wing portion 230 and the body portion 250. Furthermore, one side 233a of the first reinforcing portion 233 may be formed to be located between a connection portion between the second wing portion 230 and the body portion 250 and the side coupling portion 232, and the other side 233b may be formed to be located between a coupling portion between the second wing portion 230 and the third coupling portion 350 and the upper coupling portion 231.

The reinforcing portion 233 may have a cross-sectional shape bent to reinforce the strength of the second wing portion 230, and may have a bent portion forming inclination and a recessed groove shape. The second wing portion 230 may have a step formed with the first reinforcing portion 233 as a boundary. Furthermore, referring to FIG. 2, the first reinforcing portion 233 continuously forms a step in the second wing portion 230, but it is not limited thereto, and a bent portion may be discontinuously formed, and a recessed groove shape may be formed without forming a step. However, the present disclosure is not limited thereto, and various types of reinforcing portions configured for increasing rigidity of the second wing portion 230 may be applied. By increasing the rigidity of the second wing portion 230 through the first reinforcing portion 233, a load applied to the shock absorber 7 may be induced to the trailing arm 2 through the second wing portion 230, so that durability may be improved.

FIG. 4 is a view exemplarily illustrating a cross-section taken along line I-I' of FIG. 3A. Referring to FIG. 4 together with FIG. 2 and FIG. 3A, the first coupling portion 310 and the spring seating portion 270 may be coupled through a second reinforcing portion 390. The second reinforcing portion 390 may induce a load applied to a spring seat 300 to the trailing arm 2 by reinforcing rigidity on a side of the trailing arm 2 of the spring seat 300. Referring to FIG. 2 and FIG. 3A, the second reinforcing portion 390 may be continuously formed along a boundary to which the spring seating portion 370 and the first coupling portion 310 are coupled. The second reinforcing portion 390 may extend from a portion coupled with a third coupling portion 350 of the spring seating portion 370 to a portion coupled with the second coupling portion 330, and connect the first coupling portion 310 and the spring seating portion 370.

The second reinforcing portion 390 may have a recessed groove shape or a bent shape to reinforce the strength of the spring sheet 300. When the second reinforcing portion 390 has a bent shape, a step may be formed between the first coupling portion 310 and the spring seating portion 370 with the second reinforcing portion 390 as a boundary. Referring to FIG. 4, the second reinforcing portion 390 may be formed so that the spring seating portion 370 may be disposed higher in the height direction (Z) of a vehicle body than the first coupling portion 310. However, the present disclosure is not limited thereto, and various reinforcing means such as a recessed groove shape configured for improving rigidity without forming a step may be applied. The second reinforcement portion 390 may not only improve the rigidity of the spring seat 300, but also form the second reinforcing portion 390 on a side of the first coupling portion 310 coupled to the trailing arm 2, so that a load applied to the spring seat 300 may be induced toward the trailing arm 2. Accordingly, sufficient durability may be ensured even when a thickness of the spring sheet 300 is equal to or smaller than that of the shock absorber bracket 200. For example, the thickness of the spring seat and the shock absorber bracket according to the related art may be 2.9t, respectively. Here, even when the shock absorber bracket according to an exemplary embodiment of the present disclosure is manufactured by 2.9t and 2.6t for the spring seat, it may have superior durability than the related art. Therefore, it is possible to reduce the weight and cost of the vehicle body by making the thickness of the spring sheet thin.

Figure 5A:
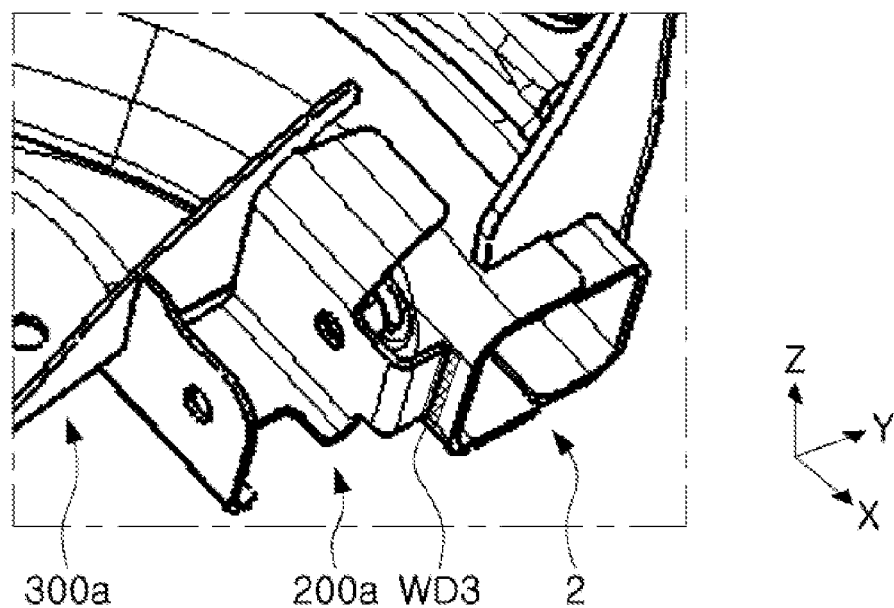
FIG. 5A is a perspective view exemplarily illustrating a shock absorber bracket coupled to a trailing arm in a height direction of the vehicle body according to the related art.
Figure 5B:
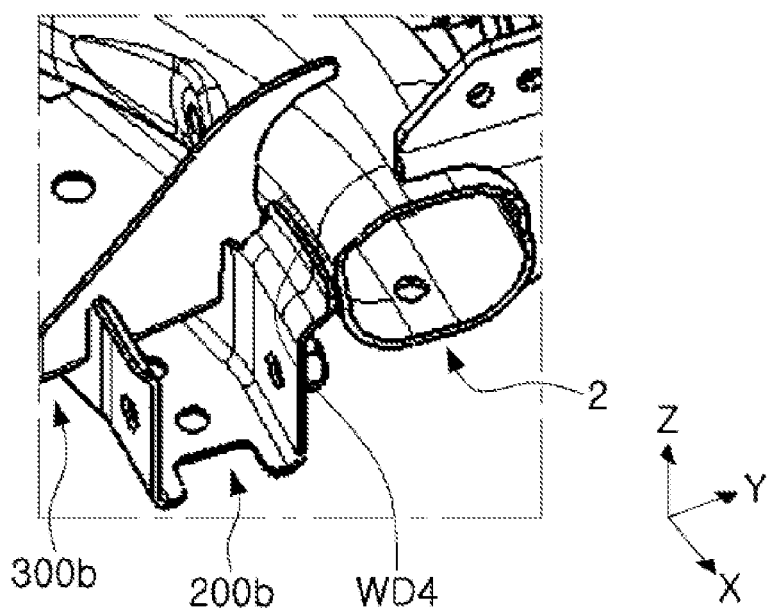
FIG. 5B is a perspective view exemplarily illustrating a shock absorber bracket coupled to the trailing arm in the longitudinal direction of the vehicle body according to the related art.

FIG. 5A is a perspective view exemplarily illustrating a shock absorber bracket coupled to a trailing arm in the height direction (Z) of the vehicle body according to the related art, and FIG. 5B is a perspective view exemplarily illustrating a shock absorber bracket coupled to a trailing arm in length direction (X) of the vehicle body according to the related art, and FIG. 6 is a graph exemplarily illustrating a change in a magnitude of a load applied to a trailing arm 2, a spring 6, a shock absorber 7, and a bump stopper 8 according to an increase in the load applied to the vehicle body. The graph exemplified in FIG. 6 illustrates the load applied to the trailing arm 2, the spring 6, the shock absorber 7, and the bump stopper 8, when 3 people (180 kg) were carried and when 4 people (240 kg) were carried and luggage (40 kg) was further loaded, assuming that one person is 60 kg. Referring to FIG. 6, when the load applied to the vehicle body increases, a weight of the trailing arm 2 increases significantly in the longitudinal direction (X) of the vehicle body rather than in the height direction (Z) thereof (referring to, T/arm Fx item in FIG. 6). It may be seen that the load of the bump stopper 8 increases significantly in the height direction (Z) of the vehicle body (please refer to the bumpstop Fz in FIG. 6). In other words, when the load applied to the vehicle body increases, the load in the height direction (Z) of the vehicle body applied to the shock absorber bracket 200 also increases significantly, and it may be seen that the load in the longitudinal direction (X) of the vehicle body also increases.

A coupling form of the shock absorber brackets 200a and 200b and the trailing arm 2 according to the related art was coupled to form a coupling portion in height direction (Z) of the vehicle body or the longitudinal direction (X) of the vehicle body. Referring to FIG. 5A, the shock absorber bracket 200 forming a coupling portion WD3 with the trailing arm 2 in the height direction (Z) of the vehicle body has poor resistance to the load applied thereto in the vehicle body length direction (X). Furthermore, referring to FIG. 5B, the shock absorber bracket 200 forming a coupling portion WD4 with the trailing arm 2 in the longitudinal direction (X) of the vehicle body has poor durability to the load applied thereto in the height direction (Z) of the vehicle body.

On the other hand, according to an exemplary embodiment of the present disclosure, the shock absorber bracket 200 may be coupled to the trailing arm 2 in an inclined state for each of the vehicle body length direction (X) and the vehicle body height direction (Z), so that durability may be secured not only under load in the vehicle body height direction (Z) but also in the longitudinal direction (X) of the vehicle body.

Furthermore, through the first reinforcing portion 233 of the shock absorber bracket 200 and/or the second reinforcing portion 390 of the spring seat 300, in addition to improving its own rigidity, it is possible to improve durability by allowing the applied load to form a load path toward the trailing arm. Furthermore, by applying a reinforcing structure for suspension device having improved durability, sufficient rigidity can be secured without increasing the thickness of the parts or changing the parts, reducing the costs.

As set forth above, according to an exemplary embodiment of the present disclosure, durability with respect to a load in the longitudinal direction (X) of the vehicle body along with the load in the height direction (Z) of the vehicle body may be improved.

According to an exemplary embodiment of the present disclosure, the load applied to the shock absorber bracket and the spring seat may be applied toward the trailing arm along the load path to improve durability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A reinforcing structure for suspension, the reinforcing structure comprising:
    a spring seat coupled to a torsion beam and a trailing arm, and configured for supporting a spring; and
    a shock absorber bracket coupled to the spring seat and the trailing arm, and configured for supporting a shock absorber for damping vibrations of the spring,
    wherein the shock absorber bracket includes a side coupling portion coupled to the trailing arm,
    wherein the side coupling portion is coupled to a side surface of the trailing arm in a width direction (Y) of a vehicle body in a state of being inclined at a predetermined angle with respect to each of a longitudinal direction (X) and a height direction (Z) of the vehicle body, and
    wherein the side coupling portion is inclined in a shape in which a length of the side coupling portion in the height direction (Z) is equal to or greater than a length of the side coupling portion in the longitudinal direction (X).

2. The reinforcing structure of claim 1,
    wherein the shock absorber bracket further includes an upper coupling portion coupled to an upper surface of the trailing arm.

3. The reinforcing structure of claim 2, wherein the shock absorber bracket includes:
    a first wing portion disposed to face the trailing arm;
    a second wing portion disposed between the first wing portion and the trailing arm to face the trailing arm, the second wing portion including the side coupling portion and the upper coupling portion; and
    a body portion connecting the first wing portion and the second wing portion,
    wherein the first wing portion and the second wing portion are coupled to the spring seat to support a load applied to the spring seat.

4. The reinforcing structure of claim 3,
    wherein each of the first wing portion and the second wing portion is fixed to a lower surface of the spring seat.

5. The reinforcing structure of claim 4,
    wherein a coupling length between the second wing portion and the lower surface of the spring seat is equal to or greater than a coupling length between the first wing portion and the lower surface of the spring seat.

6. The reinforcing structure of claim 4, wherein the spring seat further includes:
    a spring seating portion configured for supporting the spring;
    a first coupling portion coupled to the trailing arm and the spring seating portion to support the spring seating portion;

a second coupling portion coupled to the torsion beam and the spring seating portion to support the spring seating portion; and a third coupling portion coupled to the spring seating portion and a side surface of the trailing arm in the width direction (Y) of the vehicle body to support the spring seating portion.

7. The reinforcing structure of claim 6, wherein the first wing portion is coupled to a lower surface of the spring seating portion, and the second wing portion is coupled to a lower surface of the first coupling portion, and wherein a coupling length between the second wing portion and the lower surface of the spring seat is equal to or greater than a coupling length between the first wing portion and the lower surface of the spring seat.

8. The reinforcing structure of claim 1, wherein the shock absorber bracket further includes:

a first wing portion disposed to face the trailing arm;

a second wing portion disposed between the first wing portion and the training arm to face the trailing arm, the second wing portion having the side coupling portion; and a body portion connecting the first wing portion and the second wing portion, wherein the second wing portion further includes a first reinforcing portion for inducing a load transmitted to the shock absorber bracket to the trailing arm.

9. The reinforcing structure of claim 8, wherein the first reinforcing portion is bent and extends along a bonding surface of the second wing portion and the spring seat from an upper end portion of the second wing portion downwardly.

10. The reinforcing structure of claim 8, wherein the first reinforcing portion is bent and extends along a bonding surface of the second wing portion and the body portion.

11. The reinforcing structure of claim 8, wherein the first reinforcing portion extends in the height direction (Z) of the vehicle body and then in the longitudinal direction (X) of the vehicle body.

12. The reinforcing structure of claim 7, wherein the spring seat further includes:

a second reinforcing portion between the first coupling portion and the spring seat portion for inducing a load transmitted to the spring seat to the trailing arm.

13. The reinforcing structure of claim 12, wherein, in the second reinforcing portion, a step difference between the first coupling portion and the spring seating portion is formed along a connection portion of the first coupling portion and the spring seating portion.

14. The reinforcing structure of claim 12, wherein a thickness of the spring seat has a value, less than or equal to a thickness of the shock absorber bracket.

15. A reinforcing structure for suspension, the reinforcing structure comprising:

a spring seat coupled to a torsion beam and a trailing arm, the spring seat configured for mounting a spring thereon; and a shock absorber bracket coupled to the trailing arm by at least two coupling portions, the shock absorber bracket configured for mounting a shock absorber mounted, wherein the shock absorber bracket is coupled to an upper surface of the trailing arm while forming inclination, narrower than a predetermined angle of inclination with respect to a longitudinal direction (X) of a vehicle body, and is coupled to a side surface of the trailing arm in a width direction (W) of the vehicle body while forming inclination with respect to each of the longitudinal direction (X) of the vehicle body and a height direction (Z) of the vehicle body, and wherein, in a coupling portion being coupled thereto while forming the inclination, the coupling portion is inclined in a shape in which a length of the coupling portion in the height direction (Z) is equal to or greater than a length of the coupling portion in the longitudinal direction (X).

16. The reinforcing structure of claim 15, wherein the predetermined angle of inclination is 0 degrees or more and 20 degrees or less.

* * * * *